United States Patent [19]

Walker

[11] 4,009,826
[45] Mar. 1, 1977

[54] VARIABLE VALUE CONSTANT VOLUME FLOW DEVICE

[76] Inventor: Jordan E. Walker, 752 S. University Drive, Riverside, Calif. 92507

[22] Filed: Oct. 14, 1975

[21] Appl. No.: 621,733

[52] U.S. Cl. .............................. 236/49; 137/504; 137/517; 138/46
[51] Int. Cl.² ....................................... F16K 31/12
[58] Field of Search ............. 137/504, 517, 505.46, 137/505.47; 138/46; 251/58; 267/36 R, 36 A; 185/37, 45; 236/49

[56] References Cited

UNITED STATES PATENTS

| | | | |
|---|---|---|---|
| 3,037,528 | 6/1962 | Baars et al. | 138/46 |
| 3,092,397 | 6/1963 | Dullabaun et al. | 267/36 A X |
| 3,204,664 | 9/1965 | Gorchev et al. | 236/49 X |
| 3,255,963 | 6/1966 | Gorchev et al. | 138/46 X |
| 3,763,884 | 10/1973 | Grassi et al. | 137/504 |

*Primary Examiner*—Alan Cohan
*Assistant Examiner*—Gerald A. Michalsky
*Attorney, Agent, or Firm*—Poms, Smith, Lande & Glenny

[57] ABSTRACT

An improved constant volume flow device wherein the device includes a body defining a flow passage with an inlet portion and an outlet portion. The body is adapted to conduct a flow of fluid through the passage wherein such flow has a varying pressure at the inlet portion. A restricting member in the flow passage for axial movement therealong to regulate the fluid flow through the passage is also provided. The improvement includes the provision of means for varying the value of the constant volume of fluid flow of the device. Further, a progressively decreasing portion may be formed between the inlet and outlet portions and this shape, as affected by the varying value means, may be given by formulas.

17 Claims, 6 Drawing Figures

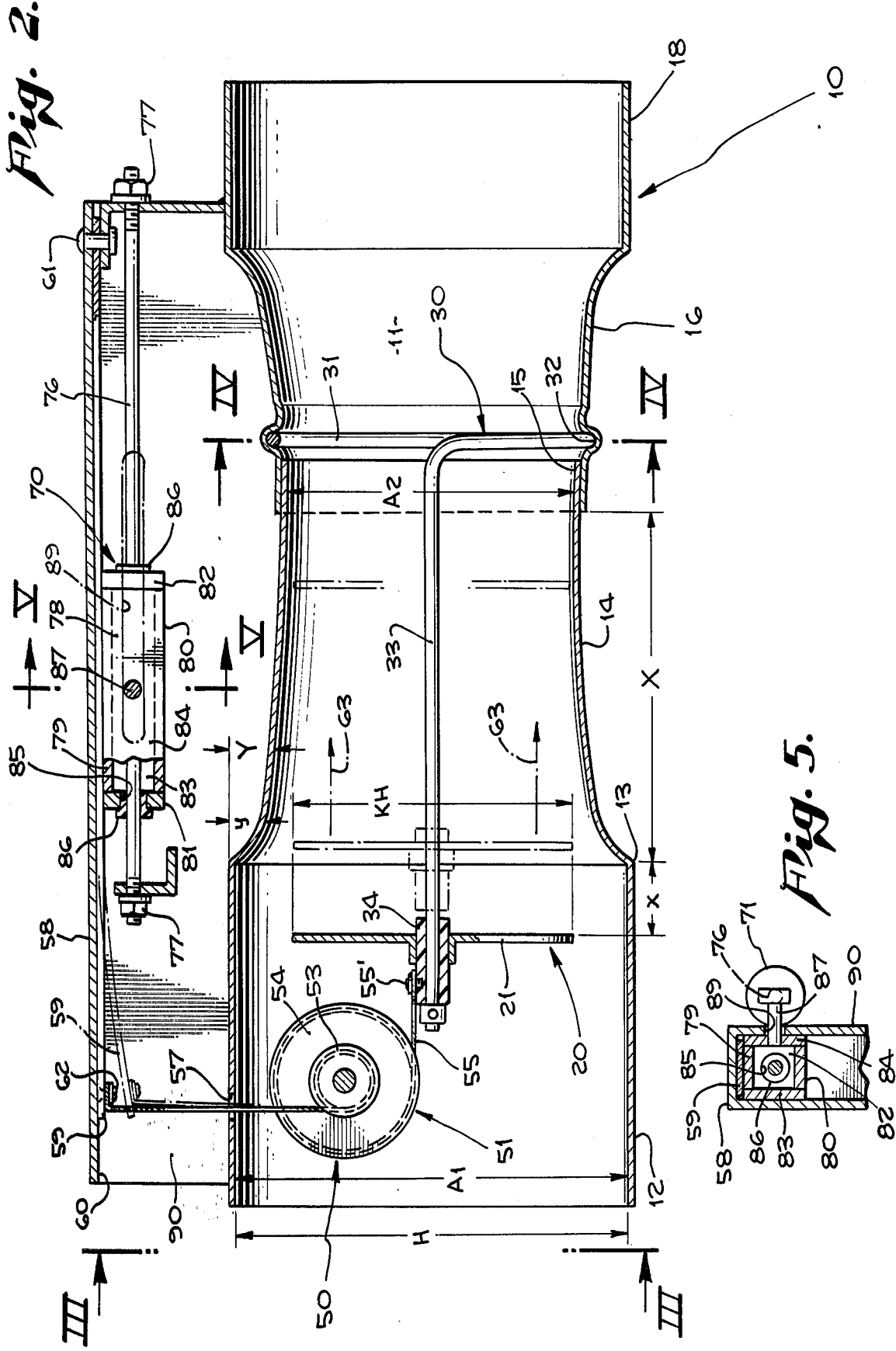

VARIABLE VALUE CONSTANT VOLUME FLOW DEVICE

BACKGROUND OF THE INVENTION

1. Field of the Invention

The invention relates to pipes and tubular conduits; and, more particularly, to a conduit having a constant volume flow despite varying inlet pressure, the constant volume being variable.

2. Description of the Prior Art

In U.S. Pat. No. 3,763,884 to Grassi et al, a constant volume flow device is described which accurately provides a constant fluid flow. In this device, fluid pressure acts on a spring-biased restricting member which reduces the cross-sectional area of the passage through which air flows and maintains a constant volume air flow. The device of the Grassi et al patent has a particular relationship between the areas of the restricting member, the spring force and the shape of the fluid passage to automatically provide constant fluid flow regardless of variations in the inlet pressure.

However, the supply of air to such devices varies. The aforementioned patent to Grassi et al has limited field of adjustment of approximately fifteen percent (15%). That is, the device described in the Grassi et al patent can handle an increase in air flow of approximately fifteen percent (15%) before the spring therein goes beyond its elastic limit.

There is thus a need for a constant volume flow device wherein the value of the constant volume setting of the device may be varied to accommodate a varying supply of air thereto.

SUMMARY OF THE INVENTION

It is an object of this invention to provide an improved constant volume flow device wherein the value of the constant volume setting of the device may be varied.

It is a further object of this invention to provide a variable value constant volume flow device which may change flow demand in the system in which the device is installed while correcting for pressure fluctuations in the system.

It is still another object of this invention to provide a variable value constant volume flow device which may automatically change the flow rate from 100% down to 25% at any given pressure within the system in which the device is installed.

It is still further an object of this invention to provide an improved constant volume flow device having a substantially increased capacity over known such devices.

These and other objects are preferably accomplished by providing a constant volume fluid flow device having a body defining a flow passage with an inlet portion and an outlet portion. The body is adapted to conduct a flow of fluid through the passage wherein such flow has a varying pressure at the inlet portion. A restricting member is provided with means for movably mounting the restricting member in the flow passage for axial movement therealong to regulate the fluid flow through the passage. The improvement includes means for varying the value of the constant volume supply of fluid through the device. A progressively decreasing portion may be disposed between the inlet and outlet portions, the shape thereof, as affected by the varying value means, may be given by formulas.

BRIEF DESCRIPTION OF THE DRAWINGS

FIG. 2 is a side view taken along the plane II—II of FIG. 1;

FIG. 5 is a view taken along the plane V—V of FIG. 2; and

DESCRIPTION OF THE PREFERRED EMBODIMENTS

Figure 1:
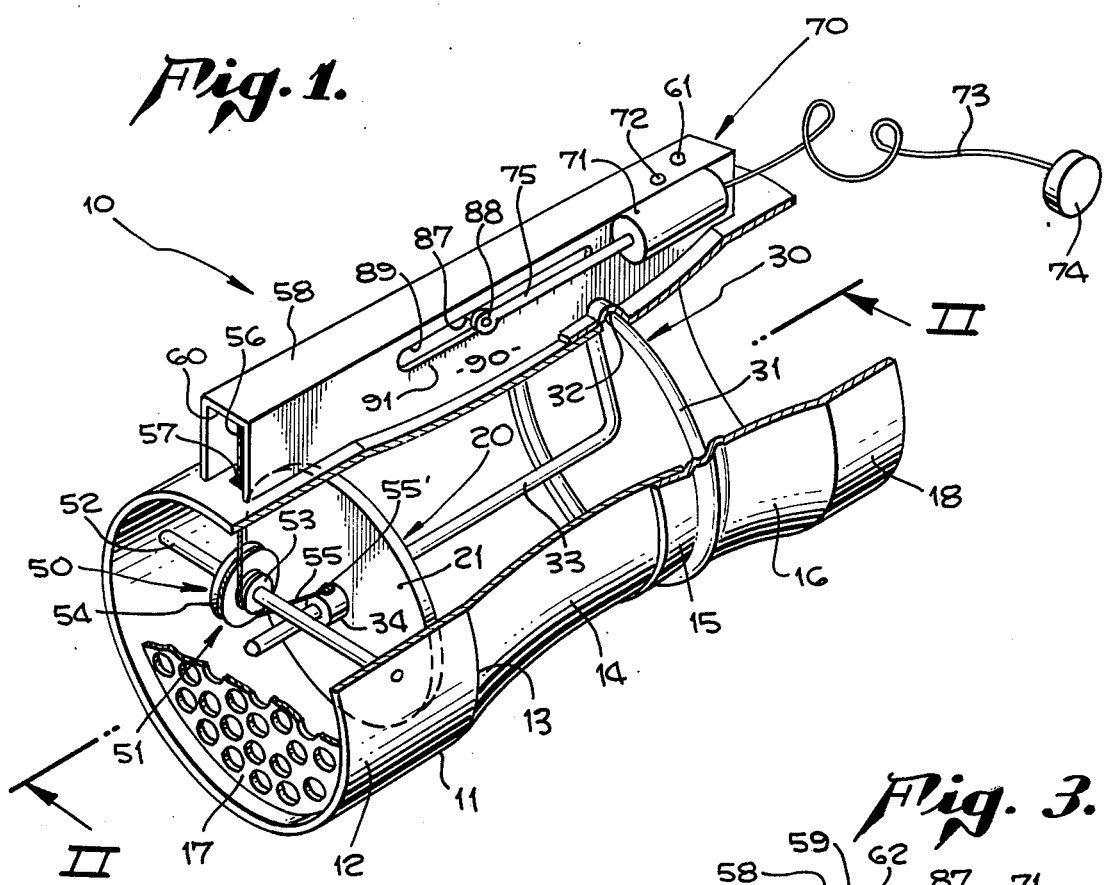
FIG. 1 is a partially cut-away, perspective view showing the improved constant fluid flow device, according to this invention, for use in a circular cross-section duct.
Figure 4:
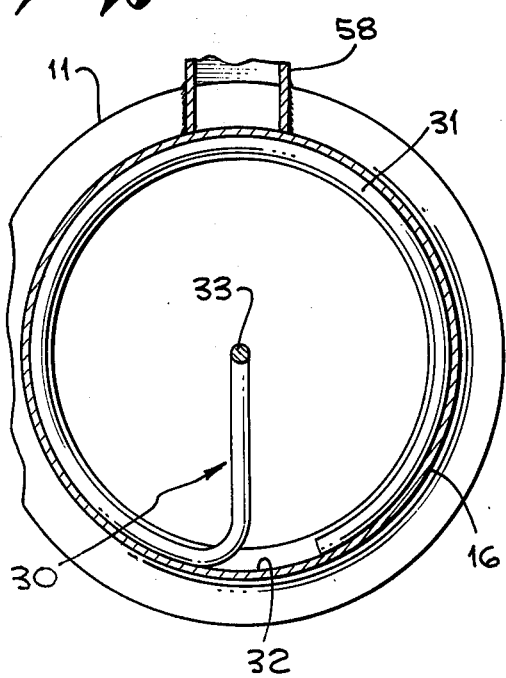
FIG. 4 is a view taken along the plane IV—IV of FIG. 2.
Figure 3:
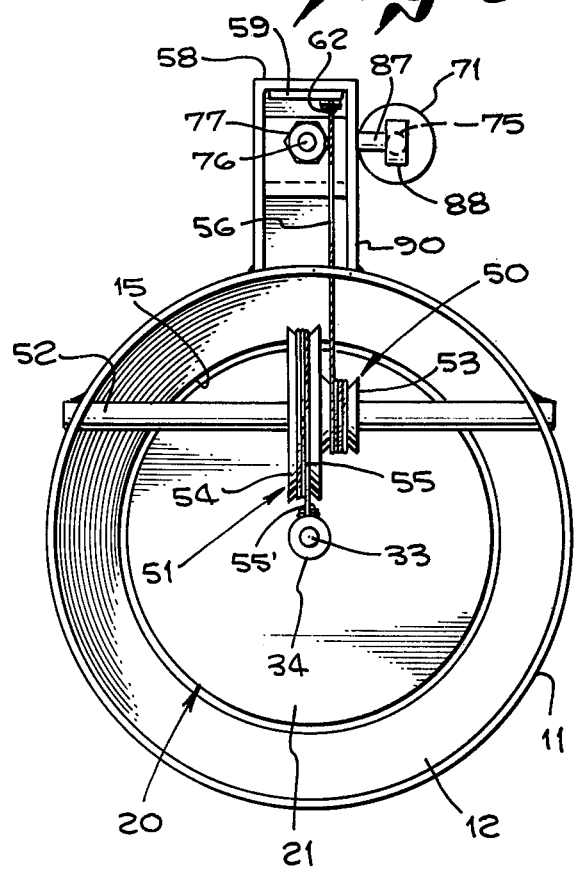
FIG. 3 is an end view taken along the plane III—III of FIG. 2.

Referring now to the drawings and particularly to FIG. 1, a constant volume fluid flow device which embodies this invention is generally denoted by the number 10. The device 10 is for installation into a system of ducts to automatically regulate the flow of fluid therein to provide a constant volume flow of fluid regardless of variations in upstream or inlet pressure. While the device 10 is illustratively shown for use in an air conditioning system, the device 10 may be modified for use in any fluid flow situation.

Generally, the device 10 includes a conduit or body 11 having a flow passage therein with an inlet portion 13, an outlet portion 15 and a progressively decreasing portion 14 therebetween with the progressively decreasing portion being shaped, according to a predetermined relationship, as discussed in detail in U.S. Pat. No. 3,763,884, the teachings of which are incorporated herein by reference. Thus, although the pertinent portions of the device illustrated and described in the patent to Grassi et al will be set forth and described hereinbelow, reference should be made to the aforementioned Grassi et al patent for a complete understanding of the operation of the device and the various modifications thereof.

Thus, referring once again to FIG. 1, a restricting member 20 of similar transverse shape to the flow passage is associated with device 10. Means 30 is provided for movably mounting the restricting member 20 in the flow passage for axial movement therealong. Means 50 is provided for biasing the restricting member upstream and so that the flow of fluid against the restricting member 20 will automatically position the member 20 in the progressively decreasing portion 14 suitable to provide a constant volume flow regardless of variations in upstream pressure.

Means 70 are provided for varying the value of the constant volume fluid flow of device 10. As discussed in the aforementioned patent to Grassi et al, the body 11 of device 10 could be of any cross-section suitable for the cross section of the duct to which it is to be joined. The construction of body 11 may also be of any suitable thin-walled material, such as sheet metal, plastic, etc.

Axially, as shown in FIG. 2, the flow passage in the body 11 is divided into portions of varying cross-section beginning with an initial portion 12 of generally uniform cross-section which will be joined to the upstream duct (not shown) to receive fluid therefrom. The initial portion 12 terminates at an inlet portion 13 at which a progressively decreasing portion 14 begins to decrease in cross-section along its length according to a relationship as will be later explained in detail. The progressively decreasing portion 14 terminates in an outlet portion 15 which has the smallest cross-sectional area. The outlet portion 15 joins to a progressively increasing portion 16. The progressively increasing portion 16 terminates in a final portion 18 of generally the same cross-section as the initial portion 12. The final portion 18 may exhaust the fluid directly into a room or may be joined to outlet ducts (not shown) to convey the fluid to rooms in remote locations. A perforated disc 17 may close off the open end of initial portion 12 as shown in FIG. 1 for field verification of a flow quantity through body 11. This is, the flow of fluid may be verified by measuring the pressure drop across the disc 17 as is well known in the art.

In order to regulate the flow of fluid along the passage to provide a constant volume of fluid regardless of the upstream pressure, a restricting member 20 is provided. In the preferred embodiment, the restricting member 20 will have generally the same transverse configuration as the flow passage of the body 11 but will be of smaller dimensions. In the illustrative embodiment of FIGS. 1 and 2, the restricting member 20 is a round plate or disc 21. If the flow passage was elliptical, the disc 21 would also be elliptical, and so on, for other regular oblong section passages. In the preferred embodiment, it is desirable that the difference in dimensions of the plate or disc 21 and passage in the body 11 be uniform to make the relationship between the plate or disc 21 and its position in the progressively decreasing portion 14 easier to calculate.

Means 30 are provided for movably mounting the restricting member 20 in the flow passage of the body 11 in the progressively decreasing portion 14 thereof, for axial movement therealong to regulate the flow of fluid in the passage. The means 30 includes a ring portion 31 resiliently fitting into a groove 32 on the inner wall of outlet portion 15. An elongated guide rod 33 extends from ring portion 31, integral therewith, and is generally coaxially aligned with the central longitudinal axis of the flow passage through body 11. Guide rod 33 is longer than the length of the progressively decreasing portion 14 so as to be slidably received in an aperture through a sleeve 34 fixedly secured within the center of restricting member 20.

The biasing means 50 is for normally biasing the restricting member 20 axially towards the inlet portion 13 against the force of fluid on the disc 21. In the illustrative embodiment, as particularly contemplated in the present invention, the biasing means 50 includes a dual pulley 51 rotatably mounted on a cross-rod 52 fixedly secured within the inlet portion 13 of body 11. Pulley 51 includes a pair of coupled pulleys 53 and 54, pulley 54 being substantially greater in diameter than pulley 53. A flexible cable 55, of a suitable material such as stainless steel, is fixedly secured at one end to sleeve 34 via screw 55' or the like and at the other end to the larger pulley 54. A like flexible cable 56 is fixedly secured at one end to the smaller pulley 53 and extends out of body 11 through an aperture 57 therein. The cables 55, 56 encircle grooves in pulleys 53 and 54 and the connection of cables 55, 56 to pulleys 53, 54 is such that movement of the larger pulley 54, due to fluid flow as will be discussed, transmits movement to the smaller pulley 53 and thus to the spring as to be described.

Means 50 further includes a spring housing 58 having an elongated leaf spring 59 therein (see FIG. 2) secured at one end to the inner upper wall 60 of housing 58 by a suitable rivet 61 or the like. The free end of cable 56 is also secured, via a rivet 62 or the like, to the free end of leaf spring 59. As will be discussed, disc 21 moves under the force of fluid in the direction of arrows 63 (FIG. 2) along guide rod 33 biased by its connection to leaf spring 59.

However, as particularly contemplated in the present invention, variable value means 70 are provided for varying the value of the constant volume of fluid flow through device 10. In the exemplary embodiment of the invention, such variable value means 70 includes a remotely controlled motor 71, such as an electric or pneumatic motor, secured to the upper wall 60 of housing 58 (FIG. 1) via rivet 72 or the like, and operably connected, via electric conduit 73, to a thermostat 74. Motor 71 includes a rod or shaft 75 which is activated by motor 71 to move linearly with respect thereto.

A traveler rod 76 is fixedly secured within housing 60 (see FIG. 2) via threaded bolts 77 or the like and a traveler 78 is slidable along rod 76. Traveler 78 includes an upper surface or wall 79 bearing against leaf spring 59 and a lower surface or wall 80 secured to upper surface 79 by end walls 81, 82. Traveler 78 may be enclosed by spaced interconnected side walls 83, 84 and suitable apertures 85 may be provided in end walls 81, 82 for receiving bushing 86 therein with rod 76 passing through bushings 86. In this manner, traveler 78 is slidable or movable along rod 76.

A connecting rod 87 interconnects side wall 84 with the free end 88 of shaft 75 (see also FIG. 1). This rod 87 is movable in an elongated slot 89 formed in side wall 90 of housing 58 (see FIG. 1).

In operation, the disc 21 and the guide rod 33 are located in the passage of the body 11 with the rod 33 extending through the sleeve 34 for axial movement of disc 21 along body 11. As disc 21 is moved under the force of fluid flow in the direction of arrows 63 from the solid line position in FIG. 2 to the dotted line position, pulley 54 is rotated, due to the connection of cable 55 to both sleeve 34 and pulley 54. Since pulley 53 is connected for rotation to pulley 54, it also rotates, cable 56 moving spring 59 from its solid line position in FIG. 2 to its dotted line position due to the connection of cable 56 to both pulley 53 and spring 59.

Thus, spring 59 exerts a biasing force on disc 21. This biasing force may be changed by changing the effective working length of spring 59. Thus, traveler 78 may be moved along rod 76 to vary the overall effective working length of spring 59. This may be accomplished either manually, by manually moving traveler 78 along rod 76 to press surface or upper wall 79 against spring 59 (in this case, rod 76 may be threaded in suitable openings in traveler 78, if desired), or thermostatically controlling motor 71 via thermostat 74, as will be discussed further, to move shaft 75 and thus connecting rod 87 to thereby move traveler 78 as shown in FIG. 1. Indicia 91 may be associated with slot 89 to provide a readily readable scale for determining the quantity of air flow through body 11 by changes in the effective working force of spring 59 by the position of traveler 78.

Thus, the disc 21 moves axially against the biasing of the spring 59 because of the pressure of the fluid flowing thereagainst. Since the position of the disc 21 in the progressively decreasing portion 14 of the passage of the body 11 is directly related to the pressure of the fluid thereagainst, the position of the disc 21 and the shape of the progressively decreasing portion should be provided with a relationship which compensates for the variation in pressure by changing the flow area and thereby automatically maintaining the constant flow.

Since the area of the disc 21 is fixed, an increase in the upstream pressure will produce a force which will cause the spring 59 to deflect until the force of the spring 59 balances the force of the fluid on the disc 21. At this balance location of the disc 21 in the progressively decreasing portion 14, the difference in the cross-sectional areas of the passage and the disc 21 should be such that the desired volume of fluid flow for the given pressure is provided. For a decrease in the upstream pressure, the force on the disc 21 will decrease and, to balance this force, the spring 59 will return to move the disc 21 to a different location in the progressively decreasing portion 14. At this location, again the difference in cross-sectional areas of the disc 21 and the passage should be such that the same volume of fluid flow for the different given pressure is provided. It is this relationship between the cross-sectional areas of the disc 21 and passage along the axial length of progressively decreasing portion 14 which will make the previously described structure into a constant flow device 10 all as described in detail in the aforementioned patent to Grassi et al.

The configuration of body 11 may be determined according to mathematical formula to maintain flow control accuracy of plus or minus two percent (2%) through the length of stroke X (e.g., 6''), as indicated in FIG. 2, for any K or rate of the blade spring 59 established by the traveler 78. The fluid flow, Q equals AV where A is the open cross-sectional area and V is the fluid velocity and since the fluid flow Q is to be constant throughout the flow passage of the body 11, $A_{inlet} V_{inlet} = A_x V_x$ where $x$ is a variable distance into the progressively decreasing portion. Bernoulli's Energy Equation for substantially equal height above a datum plane where W is the specific weight in pounds per cubic foot, is $P_{inlet}/W\,2 + V^2_{inlet}/2g = P_x/W\,2 + V_x^2/2g$ or $$P_{inlet} - P_x = \left(\frac{V_{inlet}}{2\alpha/W}\right)\left(\frac{A^2_{inlet}}{A^2_{inlet}}\right)\left[\frac{A_{inlet}}{A_x} - 1\right]$$

$$= \left(\frac{Q}{\sqrt{\frac{2g}{w}}} A^2_{inlet}\right)^2 \left[\left(\frac{A_{inlet}}{A_x}\right)^2 - 1\right]$$

Since Q is a constant, and the area of the inlet is a constant, then $P_{inlet} - P_x =$ Constant $[(A_{inlet}/A_x)^2 - 1]$. The location of disc 21 in the progressively decreasing portion 14 is determined by the balance between the force exerted by the spring 59 and the force of the fluid pressure on the disc 21, i.e., the pressure at $x$ distance into the inlet times the area of the disk equals the spring force of the spring at $x$ distance into the progressively decreasing portion 14. Since the area of the disc is a constant, $P_{inlet} - P_x =$ constant $[(A_{inlet}/A_x)^2 - 1]$ equals the change in the force exerted by the spring as the spring 59 is deflected. Thus, the relationship required for constant flow is: $[(A_{inlet}/A_x)^2 - 1]$ equals a constant times the spring force at the distance $x$.

Spring forces over the distance $x$ can be represented by very complicated formulas for many types of springs but for special springs, known as linear springs, the spring force over a variable distance $x$ is linear. A general linear equation is $y = M_x + B$ with the values of M and B determined by the physical boundaries. Thus our formula becomes $[(A_{inlet}/A_x)^2 - 1] = M_x + B$ for linear springs.

If $x$ is related to the degree of flexing of spring 59, which of course will vary with its effective working length, and y is the decrease in height from the inlet portion 13 of the progressively decreasing portion 14, then the equation may be solved for the constants M and B for the various shapes of ducts.

In the aforementioned patent to Grassi et al, a formula was presented for a round cross-section duct having an inlet portion radius $R_1$, a ratio K between the radius of the inlet portion and the radius of the plate 21, and a total length X for the progressively decreasing portion 14 (see Column 6, lines 30 – 39 of the Grassi et al patent).

However, in this formula, the spring force of the spring 51 used in the device in the aforementioned Grassi et al patent was ignored since the deflection length remained constant. The linearity of spring 59 in the present device 10 however, is biasable. Thus, where the quantity of $Ai/Ax$ equals the linear resistance $(Mx + B)$ of spring 59 times the rate increase of the biasing force R of spring 59, the net free area K is decreased a distance of x resulting in the following formula for device 10 having the varying value means 70 as disclosed hereinabove:

$$Y = R_1 \left[1 - \left\{\left[\frac{\left(\frac{Ai}{Ax}\right)^2 (Mx+B)\,R - (-k^2)^{-2}}{X}\right]^{-1/2} x + (1-k^2)^{-2}\right)^{1/2} + k^2\right\}\right]$$

The proof of the effectiveness of this invention is shown in the results of tests performed on ducts having a variable value constant volume fluid flow device 10 in accordance with this invention installed therein. The test results are for a circular duct device 10 having an inlet of 7 inches in diameter with device 10 installed therein, the device 10 including the value varying means 70 as heretofore described for varying the spring rate.

| rate. Run No. | 1 | 2 | 3 | 4 |
|---|---|---|---|---|
| Pressure Drop Increase (in.) | .105 | .2 | .5 | 1.0 |
| Flow Rate (CFM) | 102.5 | 120 | 185 | 270 |

Figure 6:
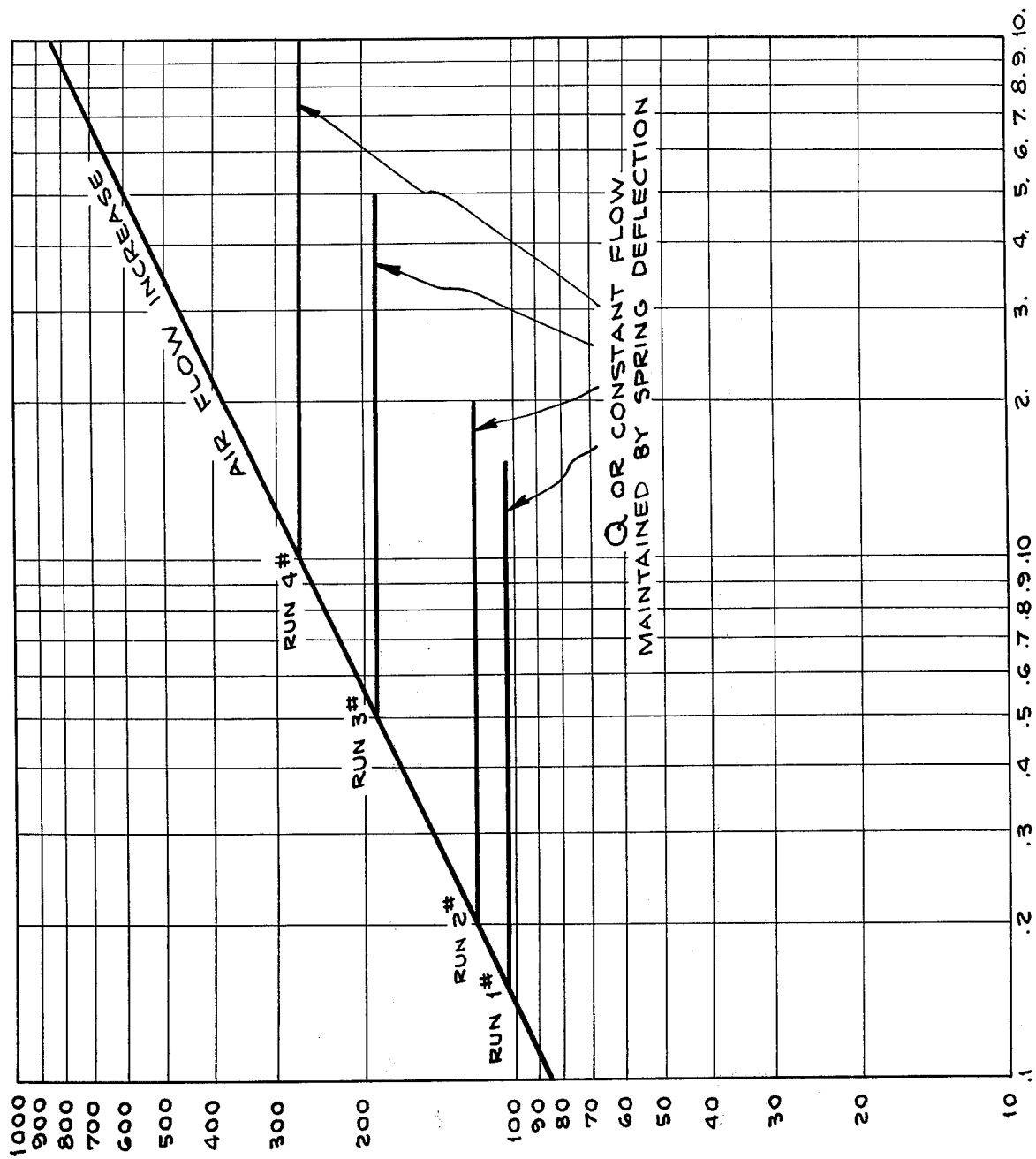
FIG. 6 is a graphical analysis of the inventive features of this invention.

These results are shown in graphic form in FIG. 6 as providing very nearly a constant fluid flow Q, regardless of the changes in upstream pressure, with various K rates of spring 59. Thus, the variable value constant volume fluid flow device solves problems of automatically compensating for variations in upstream fluid pressure to provide a constant volume fluid flow downstream thereof while varying the value of the constant volume of fluid flow using the techniques disclosed hereinabove.

Thus, a device 10 has been disclosed wherein a constant volume flow of fluid through body 11 is controlled by a thermostatically controlled motor to vary the effective working length of spring 59. This decreases or increases the constant volume of fluid flow in an amount depending upon the volume of input air. The linearity of spring 59 remains the same at each point of engagement with traveler 78, i.e., a constant volume is maintained at any favored control point. The variable value means may vary the constant volume flow rate from a given value of constant volume flow rate differing from the given value by an increase of about 500% or a decrease of about 20% of control volume at any given inlet static pressure.

We claim:

1. In a constant volume fluid flow device having a body defining a flow passage with an inlet portion and an outlet portion; said body adapted to conduct a flow of fluid through said passage wherein such flow has a varying pressure at said inlet portion, a restricting member movably mounted in said passage and constant volume producing means operatively engaging said restricting member for producing a constant volume flow rate through said passage in response to varying inlet pressures, the improvement comprising:
variable value means operatively engaging said restricting member for varying the setting for said constant volume flow rate from a given value of constant volume flow rate through said body to a selectively greater or lesser second value of constant volume flow rate differing from said given value by an increase of about 500% or a decrease of about 20% of control volume at any given inlet static pressure, said constant volume producing means further including biasing means engaging said restricting member for normally biasing the restricting member axially toward said inlet portion with said fluid flow forcing said restricting member axially toward said outlet portion against the action of said biasing means, said biasing means including an elongaged leaf spring having one end secured to said body and the opposite end fixedly secured to a first elongated member operatively connected to a first rotatable member mounted in said inlet portion, a second rotatable member fixed to said first rotatable member for rotation therewith, and a second elongated member fixedly secured to said restricting member.

2. In the device of claim 1 wherein said variable value means includes remotely controlled means operatively engaging said restricting member for automatically varying the value of said constant volume of fluid flow in response to changes in the ambient temperature experienced by said remotely controlled means.

3. The device of claim 1 wherein both of said rotatable members are pulleys, said second rotatable member being greater in diameter than said first rotatable member, and both of said elongated members are cables.

4. The device of claim 1 wherein said elongaged leaf spring is mounted in a housing operatively engaging said body, and said variable value means includes traveler means operatively engaging said housing movable along said leaf spring and in engagement therewith for varying the working length of said leaf spring.

5. The device of claim 4 wherein said variable value means includes an elongated traveler rod operatively engaging said housing, said traveler means comprising a housing having an upper wall bearing against said leaf spring, said traveler means being movable along said traveler rod.

6. The device of claim 4 including remotely controlled means operatively connected to said traveler means and adapted to move said traveler means along said leaf spring in engagement therewith.

7. The device of claim 6 wherein said remotely controlled means includes a motor operatively connected to said traveler means and a thermostat operatively connected to said motor.

8. The device of claim 1 wherein said outlet portion is of smaller cross-section than said inlet portion and a progressively decreasing portion is disposed between said outlet and inlet portions, said restriction member being substantially the same transverse cross-section as the cross-section of the flow passage but with smaller dimensions, the shape of said progressively decreasing portion providing a cross-section along its length thereof having the relationship of $[(A_i/A_x)^2-1]^{1/2}$ equals the increase in biasing force of said biasing means as the restricting member is displaced a distance $x$ from the inlet portion into the progressively decreasing portion, wherein $A_i$ is the cross-sectional area of the inlet portion, $A_x$ is the open cross-sectional area between the progressively decreasing portion and the restricting member located the distance $x$ from the inlet portion; and
said biasing means increasing linearly with the distance $x$ from the inlet portion such that the relationship $[(A_i/A_x)^2-1]^{1/2}$ equals a linear function of the distance $x$, so as to automatically regulate the fluid flow at said outlet portion and keep said flow constant regardless of the varying pressure at said inlet portion.

9. In the constant fluid flow device of claim 8 wherein said body defines a flow passage of circular cross-section and said restricting member is also circular in transverse configuration and has a smaller diameter than that of said flow passage, and wherein the relationship between a decreasing value Y in the diameter of the flow passage as a function of the axial distance x into the progressively decreasing portion is shown by the formula:

$$Y = R_1 \left[ 1 - \left\{ \left[ \frac{\left(\frac{A_i}{A_x}\right)^2 (Mx+B) R - (-k^2)^{-2}}{X} x + (1-k^2)^{-2} \right]^{-1/2} + k^2 \right\}^{1/2} \right]$$

where $M_x+B$ equals the linear resistance of the spring and $R$ equals the Rate increase of the spring force for a spring force which increases linearly also as a function of the axial distance $x$, and wherein $A_i$ is the cross-sectional area of said inlet portion, $A_2$ is the cross-sectional area of said outlet portion, X is the length of the progressively decreasing portion, $R_1$ is the radius of the inlet portion and k is the ratio of the radius of said inlet portion to the radius of said circular restriction member.

10. In a constant fluid flow device having a body defining a flow passage with an inlet portion, an outlet portion of smaller cross-section than the inlet portion, and a progressively decreasing portion between said inlet and outlet portions, said body adapted to conduct a flow of fluid through said passage wherein such flow has a varying pressure at said inlet portion, a restricting member of substantially the same transverse configuration as the cross-section of the flow passage but with smaller dimensions, means operatively engaging said restricting member for movably mounting said restricting member in said flow passage in said progressively decreasing portion thereof for axial movement therealong to regulate the fluid flow through said passage, means operatively engaging said restricting member for normally biasing the restricting member axially toward said inlet portion with said fluid flow forcing said restricting member axially toward said outlet portion against the action of said biasing means, said restricting member being located at a position in the flow passage where the force thereon from said fluid flow equals the force thereon from said biasing means, the shape to said progressively decreasing portion providing a cross-section along the length thereof having the relationship of $[(A/A_x)^2-1]^{1/2}$ equals the increase in the biasing force of said biasing means as the restricting member is displaced a distance $x$ from the inlet portion into the progressively decreasing portion, wherein $A_i$ is the cross-sectional area of the inlet portion, $A_x$ is the open cross-sectional area between the progressively decreasing portion and the restricting member located the distance $x$ from the inlet portion, said biasing means increasing linearly with the distance $x$ from the inlet portion such that the relationship $[(A_i/A_x)^2-1]^{1/2}$ equals a linear function of the distance $x$, so as to automatically regulate the fluid flow at said outlet portion and keep said flow constant regardless of the varying pressure at said inlet portion, the improvement which comprises:

variable value means operatively engaging said biasing means for varying the setting for said constant volume flow rate from a given value of constant volume flow rate through said body to a selectively greater or lesser second value of constant volume flow rate differing from said given value by an increase of about 200% or a decrease of about 50%, said biasing means including an elongated leaf spring having one end secured to said body and the opposite end fixedly secured to a first elongated member operatively connected to a first rotatable member mounted in said inlet portion, a second rotatable member fixed to said first rotatable member for rotation therewith, and a second elongated member fixedly secured to said restricting member.

11. The device of claim 10 wherein both of said rotatable members are pulleys, said second rotatable member being greater in diameter than said first rotatable member, and both of said elongated members are cables.

12. The device of claim 10 wherein said elongated leaf spring is mounted in a housing operatively engaging said body, and said variable value means includes traveler means operatively engaging said housing movable along said leaf spring and in engagement therewith for varying the working length of said leaf spring.

13. The device of claim 12 wherein said variable value means includes an elongated traveler rod operatively engaging said housing, said traveler means comprising a housing having an upper wall bearing against said leaf spring, said traveler means being movable along said traveler rod.

14. The device of claim 12 wherein said variable value means further includes thermostatically controlled means operatively connected to said traveler means for moving said traveler means along said leaf spring in engagement therewith.

15. The device of claim 14 wherein said thermostatically controlled means includes a motor operatively connected to said traveler means and a thermostat operatively connected to said motor.

16. In the constant fluid flow device of claim 12 wherein said means biasing said restricting member is provided by a linear spring, and further comprising means for adjusting the rate of said linear spring to provide different constant flow rates through said device, each constant rate being independent of pressure variations at said inlet portion.

17. In the constant fluid flow device of claim 10 wherein said body defines a flow passage of circular cross-section and said restricting member is also circular in transverse configuration and has a smaller diameter than that of said flow passage, and wherein the relationship between a decreasing value $Y$ in the diameter of the flow passage as a function of the axial distance $x$ into the progressively decreasing portion is shown by the formula:

$$Y = R_1 \left[ 1 - \left\{ \left[ \frac{\left(\frac{A_i}{A_x}\right)^2 (Mx+B) R - (-k^2)^{-2}}{X} \right] x + (1-k^2)^{-2} \right\}^{-1/2} + k^2 \right\}^{1/2} \right]$$

where $M_x + B$ equals the linear resistance of the spring and $R$ equals the Rate increase of the spring force for a spring force which increases linearly also as a function of the axial distance $x$, and wherein $A_i$ is the cross-sectional area of said inlet portion, $A_2$ is the cross-sectional area of said outlet portion, $X$ is the length of the progressively decreasing portion, $R_1$ is the radius of the inlet portion and $k$ is the ratio of the radius of said inlet portion to the radius of said circular restricting member.

* * * * *

UNITED STATES PATENT OFFICE
CERTIFICATE OF CORRECTION

Patent No. 4,009,826  Dated  March 1, 1977

Inventor(s)  Jordan E. Walker

It is certified that error appears in the above-identified patent and that said Letters Patent are hereby corrected as shown below:

Column 9, line 50, "$[(A/A_x)^2-]^{1/2}$" should read

-- $[(A_i/A_x)^2-1]^{1/2}$ --.

Signed and Sealed this

Twenty-eighth Day of June 1977

[SEAL]

Attest:

RUTH C. MASON
Attesting Officer

C. MARSHALL DANN
Commissioner of Patents and Trademarks